(12) United States Patent
Harley et al.

(10) Patent No.: US 7,429,976 B2
(45) Date of Patent: Sep. 30, 2008

(54) COMPACT POINTING DEVICE

(75) Inventors: Jonah Harley, Mountain View, CA (US); Farid Matta, Los Altos, CA (US); Storrs Townsend Hoen, Brisbane, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 514 days.

(21) Appl. No.: 10/723,957

(22) Filed: Nov. 24, 2003

(65) Prior Publication Data

US 2005/0110755 A1    May 26, 2005

(51) Int. Cl.
*G09G 5/08* (2006.01)
(52) U.S. Cl. ........................ 345/157; 345/160
(58) Field of Classification Search ......... 345/156–174; 341/22, 23
See application file for complete search history.

(56) References Cited

U.S. PATENT DOCUMENTS

| | | | |
|---|---|---|---|
| 3,987,685 A | | 10/1976 | Opocensky |
| 4,670,743 A | * | 6/1987 | Zemke ........................ 345/157 |
| 4,719,455 A | | 1/1988 | Louis |
| 5,056,146 A | * | 10/1991 | Nishide ........................ 382/131 |
| 5,086,296 A | * | 2/1992 | Clark ........................ 345/157 |
| 5,252,952 A | | 10/1993 | Frank et al. |
| 5,504,502 A | * | 4/1996 | Arita et al. .................. 345/160 |
| 5,659,334 A | | 8/1997 | Yaniger |
| 5,703,356 A | | 12/1997 | Bidiville et al. |
| 5,704,037 A | * | 12/1997 | Chen ........................ 345/184 |
| 5,739,821 A | | 4/1998 | Ho et al. |
| 5,808,603 A | * | 9/1998 | Chen ........................ 345/157 |
| 5,815,139 A | * | 9/1998 | Yoshikawa et al. .......... 345/157 |
| 5,889,507 A | | 3/1999 | Engle et al. |
| 5,914,465 A | * | 6/1999 | Allen et al. ............... 178/18.06 |
| 5,956,016 A | * | 9/1999 | Kuenzner et al. ........... 345/156 |
| 6,115,030 A | | 9/2000 | Berstin et al. |
| 6,198,473 B1 | * | 3/2001 | Armstrong .................. 345/163 |
| 6,256,012 B1 | * | 7/2001 | Devolpi ....................... 345/161 |
| 6,288,707 B1 | | 9/2001 | Philipp |

(Continued)

FOREIGN PATENT DOCUMENTS

GB    2 247 938 A    3/1992

(Continued)

OTHER PUBLICATIONS

U.S. Appl. No. 11/923,653, filed Oct. 25, 2007, Orsley.

(Continued)

*Primary Examiner*—Regina Liang (57) ABSTRACT

The pointing device has a moveable puck that moves over a surface in a puck field of motion. A position detector measures the puck position in the puck field of motion. In one embodiment, the puck includes a user sensor that detects an interaction between a user and the puck. A controller causes a cursor to move on a display in response to the puck moving in the puck field of motion when the user sensor senses the interaction between the user and the puck. The magnitude and direction of motion of the cursor is determined by the magnitude and direction of motion of the puck in the puck field of motion. In another embodiment, a restoring mechanism is provided that returns the puck to a predetermined area in the puck field of motion when the user releases the puck.

14 Claims, 7 Drawing Sheets

U.S. PATENT DOCUMENTS

| | | | |
|---|---|---|---|
| 6,292,174 | B1 | 9/2001 | Mallett et al. |
| 6,326,948 | B1 * | 12/2001 | Kobachi et al. ............. 345/157 |
| 6,492,911 | B1 | 12/2002 | Netzer |
| 6,667,733 | B2 | 12/2003 | Miyoshi |
| 6,753,848 | B2 | 6/2004 | Toshiharu |
| 6,762,748 | B2 * | 7/2004 | Maatta et al. ............... 345/157 |
| 6,816,154 | B2 | 11/2004 | Wong et al. |
| 6,961,052 | B1 | 11/2005 | Vaziri |
| 7,042,441 | B2 | 5/2006 | Adams et al. |
| 7,046,230 | B2 | 5/2006 | Zadesky et al. |
| 7,123,028 | B2 | 10/2006 | Okada et al. |
| 7,158,115 | B2 | 1/2007 | Harley et al. |
| 2003/0048262 | A1 | 3/2003 | Wu et al. |
| 2003/0076301 | A1 | 4/2003 | Tsuk et al. |
| 2003/0095096 | A1 | 5/2003 | Robbin et al. |
| 2004/0108993 | A1 | 6/2004 | Suzuki et al. |
| 2005/0052425 | A1 | 3/2005 | Zadesky et al. |
| 2005/0052426 | A1 * | 3/2005 | Hagermoser et al. ........ 345/173 |
| 2005/0052429 | A1 | 3/2005 | Philipp |
| 2005/0062732 | A1 | 3/2005 | Sinclair et al. |
| 2005/0110755 | A1 | 5/2005 | Harley et al. |
| 2006/0001657 | A1 | 1/2006 | Monney et al. |
| 2006/0038783 | A1 | 2/2006 | Shaw et al. |
| 2006/0176270 | A1 | 8/2006 | Sachs |
| 2007/0052691 | A1 | 3/2007 | Zadesky et al. |

FOREIGN PATENT DOCUMENTS

WO    WO-2006/031332    3/2006

OTHER PUBLICATIONS

U.S. Appl. No. 11/606,556, filed Nov. 30, 2007, Harley et al.
U.S. Appl. No. 60/794,723, filed Apr. 25, 2006, Harley.
U.S. Appl. No. 10/723,957, filed Nov. 24, 2003, Harley.
U.S. Appl. No. 11/407,274, filed Apr. 19, 2006, Orsley.
ARS Technica, iPod nano, http://arstechnica.com/reviews/ardware/nano.ars/4,, (1998).
"Motorola SLVR", www.motorola.com/motoinfo/product/details.jsp,(unknown).
Panasonic, "Panasonic Tactile Sheet Type ESP".
Avago Technologies, "AMRI-2000 Data Sheet".
Avago Technologies, "AMRI-2000-P000 Data Sheet".
"3M Double Coated tapes", *9731 931RW Technical Data*.

\* cited by examiner

COMPACT POINTING DEVICE

FIELD OF THE INVENTION

The present invention relates to pointing devices for controlling a cursor on a display.

BACKGROUND OF THE INVENTION

To simplify the following discussion, the present invention will be explained in terms of a pointing device for use on a computer; however, the present invention may be utilized with a wide range of data processing systems including hand held computers, cell phones, video games, and the like. Modern computer operating systems and graphics programs require a pointing device for controlling the position of a cursor on the computer display. For desktop PCs, the most successful pointing device is the "mouse". A mouse is a hand held object that is moved over a flat surface near the keyboard to control the motion of a cursor on the computer display. The direction and distance over which the mouse is moved determines the direction and distance the cursor moves on the display. A conventional mouse provides a rigid object that a user can move with great precision. For a desktop computer, the mouse provides a satisfactory solution to the pointing problem. On the occasion when the workspace is not large enough to provide a path over which the mouse can move and accommodate a desired cursor movement on the display, the user simply picks up the mouse and recenters the mouse in the workspace.

While the mouse has provided a satisfactory solution to the pointing device problem in the desktop PC market, a similarly successful device is not available for portable and hand-held computers. These computers are often used in environments that lack a sufficiently large flat surface near the keyboard over which a mouse can be moved. Hence, some other form of pointing device is needed when these computers are used in such environments.

A pointing device for use in these environments must solve the problem of moving a cursor quickly and accurately. In addition, the device must operate in an intuitive fashion that a novice user can comprehend without extensive instruction. In addition, the pointing device must operate in a limited workspace and fit within the form factor of the computer or hand held device. Finally, the usual constraints of low cost, low power consumption and high reliability must also be met.

Currently, there are two dominant solutions to the pointing device problem in the laptop marketplace, the Synaptics capacitive TouchPad™ and the IBM TrackPoint™. Other companies make versions of these devices with similar functionality. Both of these fall far short of satisfying the above requirements. The TrackPoint™ is a small button that is typically placed in the center of the laptop keyboard. The button may be moved in a manner analogous to a "joy stick" by applying a lateral force to the top of the button with a finger. Unfortunately, the button can only move a small amount; hence, the displacement of the button cannot be mapped directly into a displacement in the cursor position on the computer display. Instead, the button displacement controls the direction and speed with which the cursor moves. The accuracy with which a user can position the cursor using this type of velocity control is significantly less than that achieved with a conventional mouse. This limitation is particularly evident in tasks that require small, precise movements such as drawing in a computer graphics program.

The TouchPad™ is a blank rectangular pad, 50-100 mm on a side, typically placed in front of the keyboard of most laptops. The device senses the position of a finger on the surface of the rectangle relative to the edges of the device. This sensing is accomplished by measuring the capacitance changes introduced by a user finger on a series of electrodes beneath an insulating, low-friction material.

Like the TrackPoint™, the TouchPad™ also suffers from lack of precision. It is inherently difficult to measure the capacitive changes introduced by the user, who is at an unknown potential relative to the circuit. Furthermore, the contact area of the user's finger is relatively large. Hence, to provide an accurate measurement of the finger position, the device must determine some parameter such as the center of the contact area between the finger and the pad. Unfortunately, the contact area varies in size and shape with the pressure applied by the user. Such determinations are, at best, of limited precision. In practice, users are unable to repeatably execute precise movements.

There are also difficulties arising from false signals when the user inadvertently touches the pad with a finger or a wrist. In some devices, the "clicking" function of a conventional mouse is implemented by tapping on the pad. As a result, such inadvertent activation during typing causes the cursor to jump to a new location in the middle of the typing operation and the text being inserted at the new location.

SUMMARY OF THE INVENTION

The present invention includes a pointing device having a moveable puck that moves in a puck field of motion over a surface. A position detector measures the puck position in the puck field of motion. In one embodiment, the position detector includes surface electrodes on the surface and a puck electrode that moves with the puck, and the position detector measures the capacitance between selected ones of the electrodes. In another embodiment, the position sensor measures current flowing between selected ones of the electrodes. In another embodiment, the puck includes a user sensor that detects an interaction between a user and the puck. In another embodiment, the user sensor includes a force sensor that generates a first signal indicative of a first predetermined force applied to the puck by the user. In other embodiments, the force sensor generates a signal if the force exceeds a second predetermined force level, and/or a signal indicating the magnitude of the force. A controller causes a cursor to move on a display in response to the puck moving in the puck field of motion when the user sensor senses the interaction between the user and the puck. The magnitude and direction of motion of the cursor are determined by the magnitude and direction of motion of the puck in the puck field of motion. In still another embodiment, a restoring mechanism is provided that returns the puck to a predetermined area in the puck field of motion when the user releases the puck. Embodiments in which the restoring mechanism utilizes springs or magnetic fields are described.

DETAILED DESCRIPTION OF PREFERRED EMBODIMENTS OF THE INVENTION

Figure 1A:
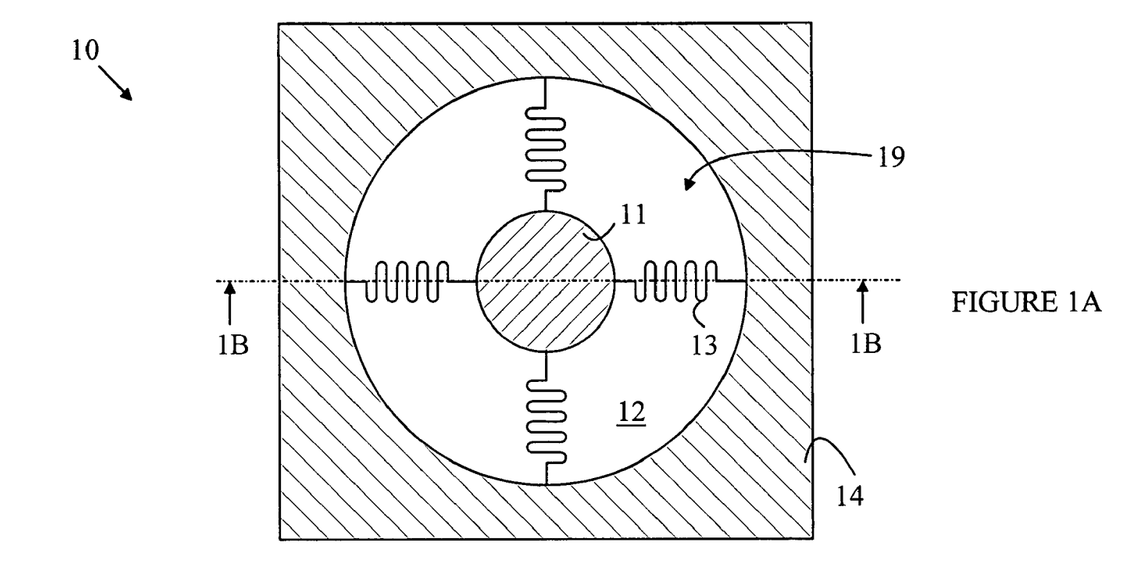
FIG. 1A is a top view of pointing device 10.
Figure 1B:
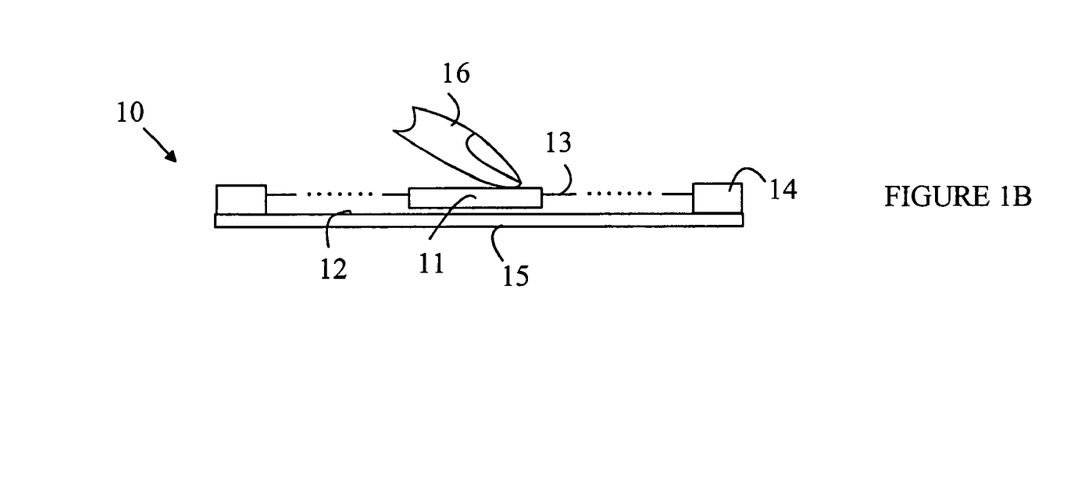
FIG. 1B is a cross-sectional view of pointing device 10 through line 1B-1B shown in FIG. 1A.

The manner in which the present invention provides its advantages can be more easily understood with reference to FIGS. 1A-1B, which illustrate a pointing device 10 according to one embodiment of the present invention. FIG. 1A is a top view of pointing device 10 and FIG. 1B is a cross-sectional view of pointing device 10 through line 1B-1B shown in FIG. 1A. Pointing device 10 includes a puck 11 that moves over a surface 12 of a substrate 15 within a puck field of motion 19 in response to a lateral force applied to puck 11. The force is typically applied to puck 11 by a user's finger, finger tip, thumb, thumb tip or multiple fingers. Puck 11 includes a pressure sensing mechanism that measures the vertical pressure applied to puck 11. In addition, pointing device 10 includes a sensing mechanism for determining the position of puck 11 on surface 12.

Figures 2A, 2B:
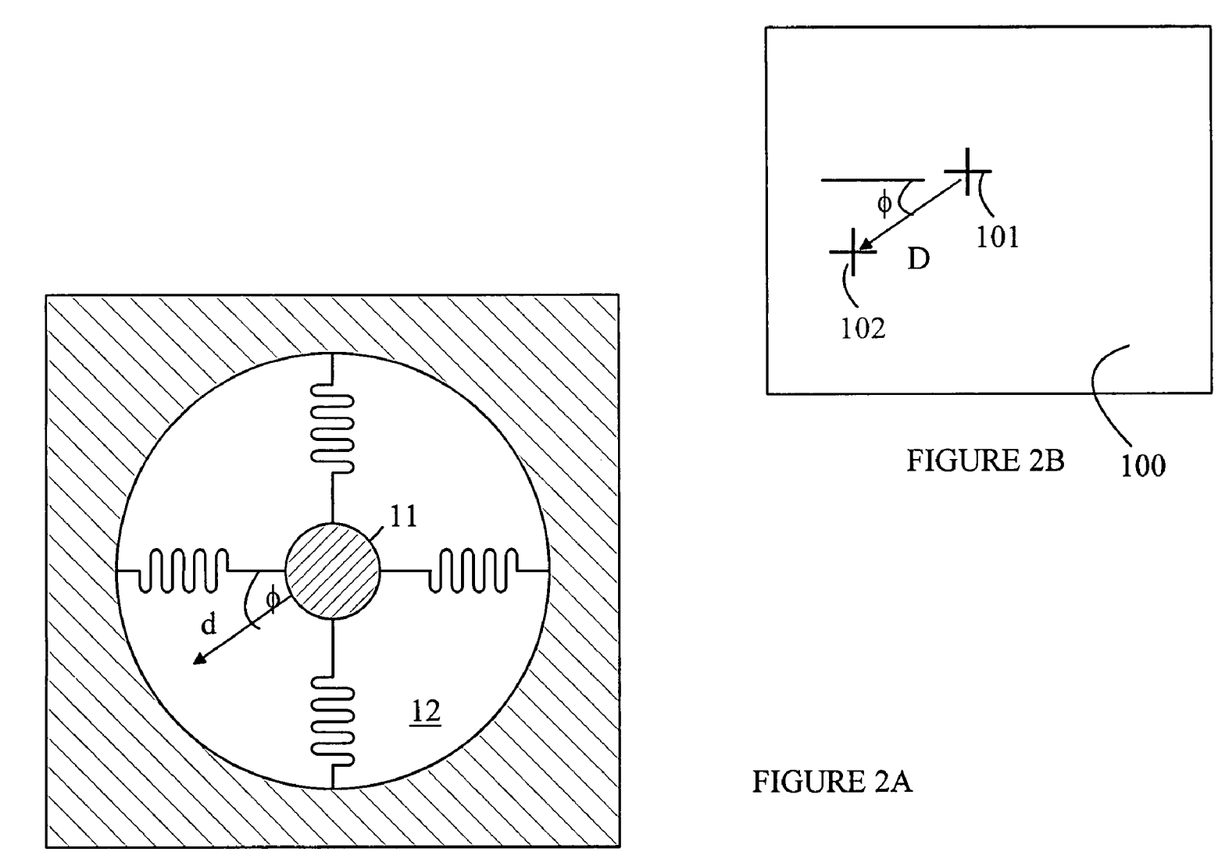
FIGS. 2A-2B illustrate the control of a cursor on a display 100 by the puck discussed above.

Refer now to FIGS. 2A-2B, which illustrate the control of a cursor on a display 100 by the puck discussed above. When the user applies a vertical force to puck 11 that is greater than a predetermined threshold, any change in the position of puck 11 on surface 12 is reported to the host apparatus of which pointing device 10 forms part. This change in position is used to move a cursor on the display by magnitude and direction that depends on the magnitude and direction of the motion of puck 11 while the vertical force was applied to puck 11. That is, if the motion of puck 11 is characterized by a magnitude d and a direction defined by an angle $\phi$ on the pointing device, the motion of cursor 101 is characterized by a magnitude D and a direction defined by angle $\phi$ on display 100.

When the user releases puck 11 by removing the user's finger 16, puck 11 is returned to its centered position by the springs shown at 13 that connect the puck to the side 14 of the puck field of motion. Since the user's finger is not applying a vertical force to puck 11 during its return, the change in position associated with that return motion is not reported to the host device. That is, cursor 101 remains at location 102. This provides a convenient "re-centering" capability, typically achieved on a mouse by lifting and replacing the mouse at the center of the field of motion. Re-centering is particularly necessary in laptop computers, hand-held devices and other miniature applications in which the field of motion is constrained.

In one preferred embodiment of the present invention, the pressure sensor in puck 11 senses two predetermined pressure levels. The first level is used to actuate the tracking of the cursor on the display as described above. The second level is used to implement the "click" function associated with a conventional mouse. Hence, the user can click at the current position of the cursor by increasing the pressure applied to puck 11. A mechanical click can also be engineered to provide tactile feedback for the "click" threshold.

Figure 3:
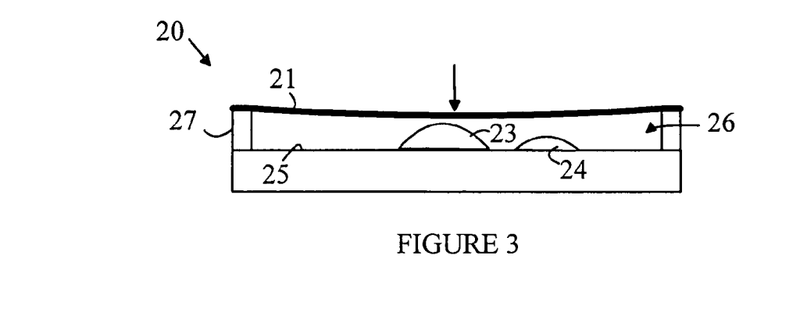
FIG. 3 is a more detailed cross-sectional view of a puck according to the present invention.

Refer now to FIG. 3, which is a more detailed cross-sectional view of a puck according to the present invention. Puck 20 includes a moveable element 21 that is suspended over a cavity 26. The distance between element 21 and the bottom 25 of cavity 26 changes in response to pressure applied to the top surface of element 21. In the embodiment shown in FIG. 3, element 21 is a deformable membrane suspended from spacers shown at 27. The distance that element 21 has traveled from its resting position is a measure of the force applied to element 21. This distance can be sensed by any suitable mechanism.

For example, two pressure switches are shown at 23 and 24. Each pressure switch is open when the force applied to element 21 is less than a predetermined value that is different for each switch. As element 21 is pushed downward, switch 23 is engaged first and switches to the conducting state. This switch signals the host device that the pointing device has now been activated. At this point, the host device begins measuring the position of the pointing device and altering the position of the cursor on the display in response to those measurements.

If the force on element 21 is increased beyond a second predetermined value, switch 24 will also be closed. The state of this switch is independently monitored by the host device of which the pointing device forms part or a controller that is part of the pointing device itself. In a conventional mouse, a button that can be actuated by the user is provided to signal the host device to take some particular note of the current position of the cursor on the display. Closing a switch by pushing this button is often referred to as "clicking" on the current cursor location. Switch 24 may be used to provide this clicking function in pointing devices that utilize puck 20.

The above embodiments of puck 20 utilize separate switches for sensing the two force thresholds. However, the force thresholds for the activation of the cursor tracking and clicking functions can be implemented using a single pressure sensing element that provides an analog measurement of the position of the surface of element 21 relative to the bottom 25 of the cavity. For example, element 21 may include an electrode that forms a capacitor with a corresponding element on the bottom of the cavity. As the distance between the surface of element 21 and the bottom 25 of the cavity changes, the capacitance of this capacitor also changes. The changes in capacitance can be measured by any of a number of conventional circuits and used to determine the distance between element 21 and the bottom of the cavity. In this case, two capacitance thresholds determine the two force thresholds described above.

The above-described embodiments utilized the elasticity of element 21 to provide a mechanism for converting the force applied to element 21 to a distance that can be measured. However, there are numerous other known mechanisms for providing this function. For example, the cavity 26 can be filled with a compressible medium such as foam rubber. In yet another embodiment, a rigid moveable element suspended over a surface by a spring mechanism can be utilized.

Figure 4:
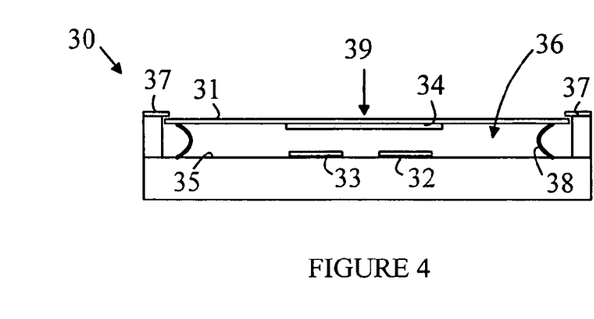
FIG. 4 is a cross-sectional view of another embodiment of a puck for use in a pointing device according to the present invention.

Refer now to FIG. 4, which is a cross-sectional view of another embodiment of a puck for use in a pointing device according to the present invention. Puck 30 includes a cavity 36 having a rigid member 31 that is suspended over the bottom 35 of cavity 36 by springs. Exemplary springs are shown at 38. When no downward force is applied to member 31, member 31 is held in place by a retaining ring shown at 37. When a force is applied in the direction shown by arrow 39, member 31 moves toward the bottom of the cavity by a distance that depends on the applied force and the spring constants of springs 38. Measuring the capacitance between electrodes 32 and 33 provides a measurement of the distance between member 31 and bottom 35.

Figure 5:
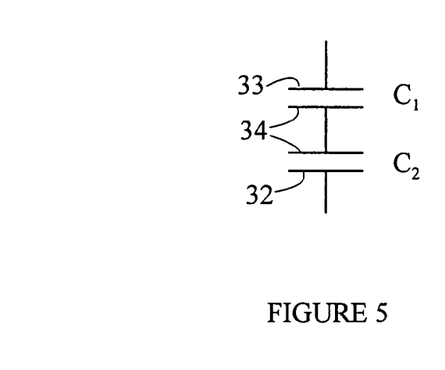
FIG. 5 illustrates the equivalent circuit formed by electrodes shown in FIG. 4.

Refer now to FIG. 5, which illustrates the equivalent circuit formed by the electrodes shown in FIG. 4. Electrodes 32, 33, and 34 form an electrical circuit that is equivalent to two capacitors connected in series with electrode 34 as the common electrode. Capacitor $C_1$, represents the capacitance between electrodes 33 and 34, and capacitor $C_2$ represents the capacitance between electrodes 32 and 34. The total capacitance between electrodes 32 and 33 depends on the distance between electrode 34 and electrodes 32 and 33. This capacitance can be sensed with the aid of external electrical connections to electrodes 32 and 33, which have been omitted from the drawing for the sake of simplicity. The capacitance measuring scheme described above does not require an external electrical connection to electrode 34, and hence, is inexpensive and simple in its implementation. However, other embodiments based on the measurement of the capacitance between electrode 34 and one or both of electrodes 32 and 33 can alternatively be utilized.

Figure 6:
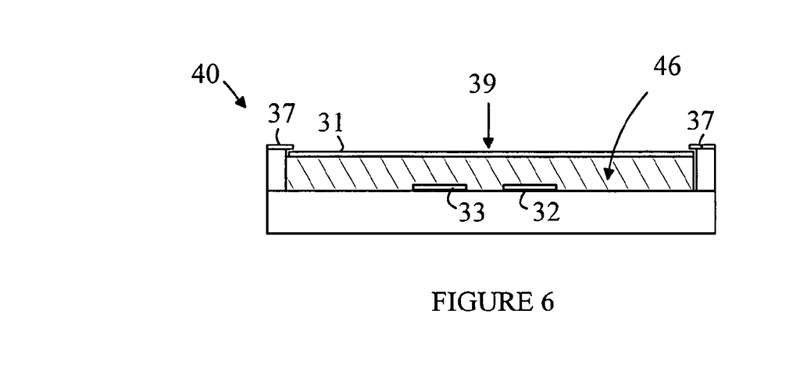
FIG. 6 is a cross-sectional view of another embodiment of a puck for use in the present invention.

While the above-described puck embodiments utilize capacitative measurements for sensing the distance between the moveable element and the bottom of the cavity, other measurement techniques can be utilized. Refer now to FIG. 6, which is a cross-sectional view of another embodiment of a puck for use in the present invention. In puck 40, the springs shown at 38 in FIG. 4 have been replaced by a conductive, compressible foam layer 46 whose resistivity depends on the compression of the foam. Such materials are well known in the art, and hence, will not be discussed in detail here. For the purpose of the present discussion, it is sufficient to note that the resistance between electrodes 32 and 33 will change with the compression of the foam.

The above-described embodiments of the present invention have been described in terms of two discrete force levels for determining the force level at which the cursor movement is engaged and at which the clicking function is activated. However, devices in which the analog force level is measured and used to implement other functions can also be implemented. For example, the analog force level can be utilized to implement the functionality of a pressure sensitive drawing device. Graphic-input devices that utilize this type of functionality are known to the art, and hence, will not be discussed in detail here. For the purposes of the present discussion, it is sufficient to note that the pressure with which the pointing device is applied to a surface is converted into some attribute of the drawing such as the width of the line currently being drawn at the cursor location on the display.

Figure 7:
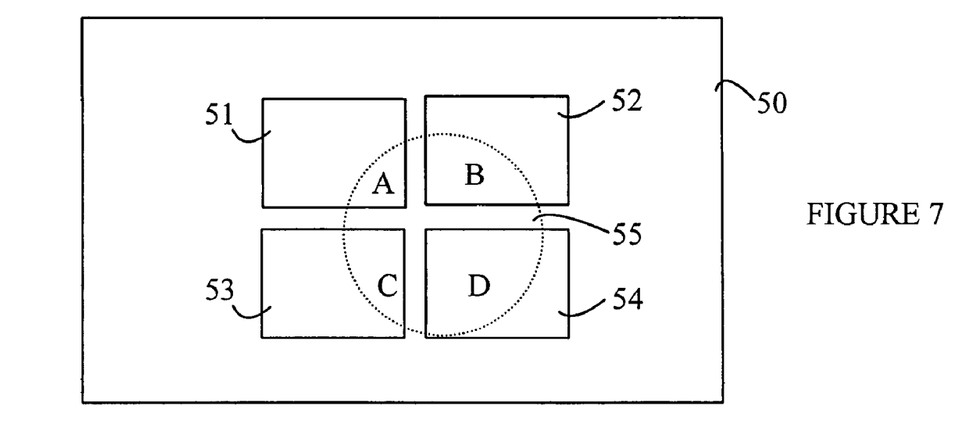
FIG. 7 is a top view of a portion of surface 12 shown in FIG. 1 over which the puck moves in one embodiment of the present invention.

An embodiment of a position detector that detects the position of the puck on the underlying surface may be more easily understood with reference to FIG. 7. FIG. 7 is a top view of a portion of surface 12 shown in FIG. 1 over which the puck moves in one embodiment of the present invention. Surface 50 includes four electrodes shown at 51-54 having terminals that are connected to an external circuit. To simplify the drawing, these terminals have been omitted. The puck has a bottom surface that includes an electrode 55 that is shown in phantom in the drawing. Electrodes 51-55 are electrically isolated from one another. For example, electrode 55 can be covered with a layer of dielectric that provides the required insulation while still allowing electrode 55 to slide over the other electrodes. The electrodes can in fact be patterned on the back of the substrate whose surface is shown at 50. This reduces the capacitance between the electrodes and the puck electrode, but can be practical for substrate thicknesses a few millimeters or less. The overlap between electrode 55 and each of electrodes 51-54 depends on the position of the puck relative to electrodes 51-54. Denote the overlaps between electrode 55 and electrodes 51-54 by A-D, respectively.

Figure 8:
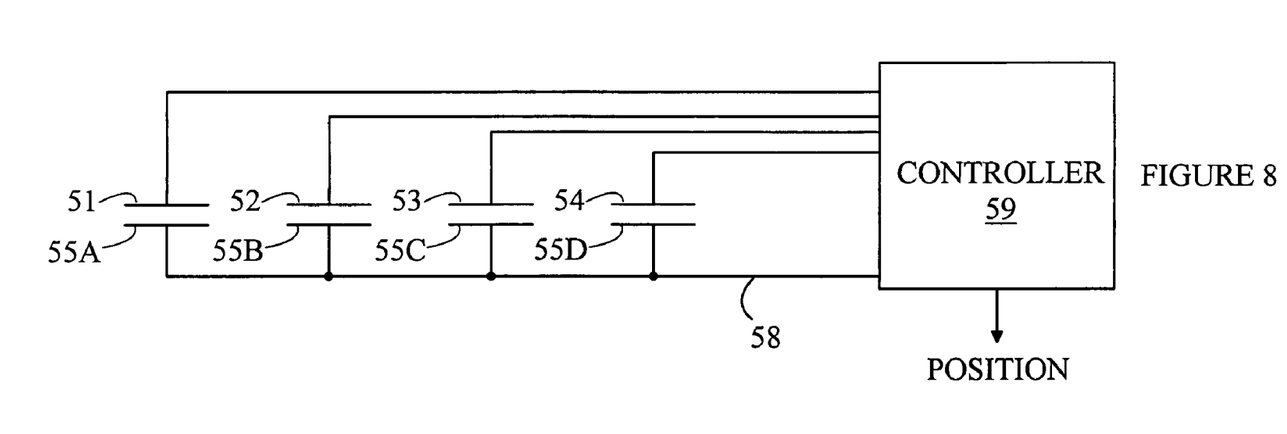
FIG. 8 is a schematic drawing of an equivalent circuit for electrodes 51-55 shown in FIG. 7.

Refer now to FIG. 8, which is a schematic drawing of an equivalent circuit for electrodes 51-55. The portion of electrode 55 that overlaps electrode 51 forms a parallel plate capacitor having a capacitance that is proportional to overlap A. Similarly, the portion of electrode 55 that overlaps electrode 52 forms a parallel plate capacitor that has a capacitance that is proportional to overlap B, and so on. Since all of the capacitors share portions of electrode 55, the equivalent circuit consists of four capacitors connected to a common electrode shown at 58. This electrode is just electrode 55. Hence, by measuring the capacitance between electrode 55 and each of electrodes 51-54, the position of electrode 55 relative to electrodes 51-54 can be determined. This determination can be made by a controller 59, which may be part of the pointing device or part of the host device of which the pointing device forms part.

In embodiments in which the puck field of motion is substantially greater than the diameter of the puck, more than 4 electrodes can be placed on the substrate. Capacitance measurements between each of these electrodes and the puck can be used to determine the puck position as described above.

The above-described embodiments of the position detector have an electrical connection to electrode 55 on the bottom of the puck. This connection can be eliminated in embodiments that measure the capacitative coupling between each pair of electrodes on surface 50. That is, the capacitance between electrodes 51 and 52 is measured separately from the capacitance between electrodes 51 and 53, and so on. Consider the capacitance between electrodes 51 and 52. The equivalent circuit is similar to that shown in FIG. 5 with $C_1$ being proportional to overlap A and $C_2$ being proportional to overlap C. Four measurements between adjacent electrodes provide information to solve for each of the four capacitances, and thereby determine the puck position.

The electrode on the bottom of the puck is preferably circular in shape to reduce errors arising from the shape of the electrode. The restoring springs allow the puck to rotate somewhat. If the user's finger is not centered on the puck during the motion of the puck, the resultant torque can cause the puck to rotate slightly. If the puck electrode is circularly symmetric, such rotations will not alter the result of the position measurement. If, on the other hand, the puck electrode is not circularly symmetric, the overlap between the puck and the various electrodes will be different for different rotations, even though the center of the puck is at the same location in each case.

Figure 9A:
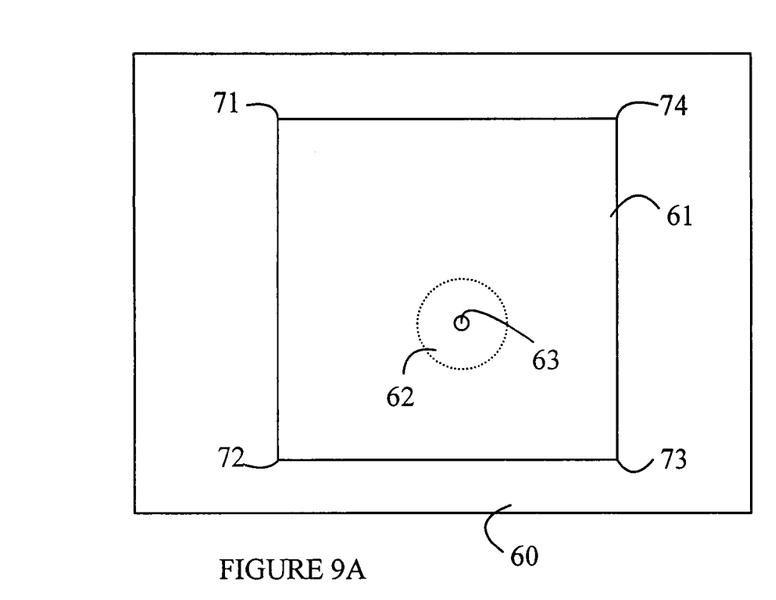
FIG. 9A is a top view of a portion of surface 12 shown in FIG. 1 over which the puck moves in another embodiment of the present invention.

In the above-described embodiments of the present invention, the position detection is done capacitatively because such measurements are less effected by dirt accumulating on the surface of the electrodes or wear in the surface of the puck or the electrodes, and consume very little power. However, other position detection mechanisms can also be utilized. Refer now to FIG. 9A, which is a top view of a portion of surface 12 shown in FIG. 1 over which the puck moves in another embodiment of the present invention. Surface 60 includes a single resistive layer 61 having electrodes at its four corners as shown at 71-74. The puck 62 slides over this layer. Once again, the puck is shown in phantom. Puck 62 includes an electrode 63 that makes contact with a very small area of resistive layer 61. By measuring the current that flows from electrodes 71-74 when a current is injected into electrode 63, the position of electrode 63 relative to electrodes 71-74 can be determined.

Figure 9B:
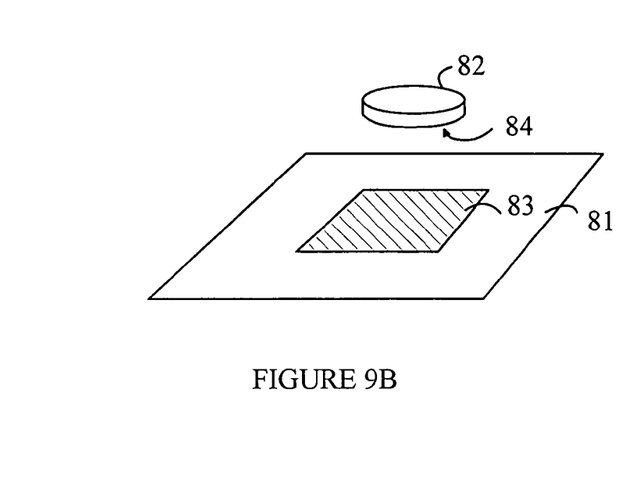
FIG. 9B illustrates an embodiment of the present invention that utilizes an optical sensor for measuring the position of the puck.

The position of the puck in the puck field of motion can also be ascertained using optical sensors such as those used in a conventional optical mouse. Refer now to FIG. 9B, which illustrates such a sensing mechanism. In this embodiment, the bottom surface 84 of puck 82 includes a pattern or texture that is illuminated by an optical mouse sensor 83 located just below the surface 81 of the puck field of motion. Optical mouse sensors are known in the art, and hence, will not be discussed in detail here. For the purposes of the present discussion, it is sufficient to note that optical mouse sensor 83 has an illumination system that illuminates the bottom surface of puck 82 and an imaging sensor that forms an image of a portion of the illuminated surface. The imaging system compares successive images of the bottom surface to determine the distance and direction in which the puck moved between the images.

The preceding examples of suitable positioning mechanisms are provided as examples. However, it will be apparent from the preceding discussion that there are a large number of position-measuring mechanisms that can be utilized without departing from the teachings of the present invention.

A number of the embodiments discussed above require that electrical connections be made to the puck. The pressure sensing mechanism requires two or three connections, depending on the particular embodiment being implemented. The position detector may require an additional connection. Referring again to FIG. 1, the springs shown at 13 are utilized for these connections in one preferred embodiment of the present invention. In such an embodiment, the springs are made from or coated with an electrically conducting material, and hence, each spring can provide an electrical connection to the puck.

The above-described embodiment of the present invention utilizes electrical connections made to the puck via the springs. However, other methods for sensing the signals associated with the puck that do not require direct connections to the puck can be utilized. Techniques for remote sensing are well known in the RF identification tag arts, and hence, will not be discussed in detail here. For the purpose of the present discussion it is sufficient to note that that the values of capacitors and inductors in a remote device can be sensed by measuring the power the device absorbs from an RF signal. For example, consider an embodiment in which the pressure applied to the puck is sensed via a change in capacitance, as described above. The capacitor whose capacitance is being measured can be incorporated into a tank circuit whose resonance frequency is sensed by measuring the power absorbed by the puck as a function of frequency from an RF antennae located on the base of the pointing device.

The embodiments of the present invention discussed above activate the coupling between the cursor on the display and the puck when the pressure applied to the puck is greater than an activation threshold level, and release the coupling when the pressure falls below this threshold. When the pressure is released entirely, the puck is returned to its centered position by the springs discussed above.

The distance through which the cursor is to move can be greater than the maximum distance that can be moved by moving the puck from its resting position in the center of the puck field of motion to the boundary of the puck field of motion. In this case, the user can make the required cursor movement in a manner analogous to that used with conventional mice, namely, recenter the puck by releasing the puck and then re-engaging the puck by placing a finger on the puck. Since the cursor was disengaged when the finger was removed prior to recentering of the puck, the user can resume moving the cursor on the display from the position on the display at which the user's finger was removed from the puck. While this approach provides a satisfactory solution for most cursor moves, there are occasions in which a very large move is needed. In such cases, accomplishing the move via a large number of smaller moves is not always satisfactory.

The above-described embodiments use a meander spring to reposition the puck when the user releases the puck. Ideally, the springs used to restore the puck position provide a restoring force that recenters the puck without requiring that the user apply a force that causes the user's hand to become fatigued. In addition, the force should not vary over the puck field of motion, since such variations can interfere with the precision with which the user can position the puck. In addition, embodiments that are designed for use in laptop computers, handheld devices and other miniature applications place a premium on both the lateral size of the pointing device and the thickness of the pointing device. Hence, designs in which the springs increase the thickness or lateral dimensions of the pointing device are not preferred.

The meander springs shown in FIG. 1 prevent the puck from reaching all portions of the field of motion. This is particularly true if the puck motion is toward the attachment point of the spring on the periphery of the puck field of motion. Hence, to provide a device with a specified area in the field of motion, a somewhat larger lateral area is needed to accommodate the unusable space on the surface that is required for the springs in their compressed state. In addition, the force required for moving the puck is different for different areas of the puck field of view. Accordingly, the meander spring design shown in FIG. 1 is less than ideal.

Common helical coiled springs have similar problems. In addition, the springs have a significant thickness, which increases the thickness of the pointing device. Hence, such springs are also not preferred.

Figure 10:
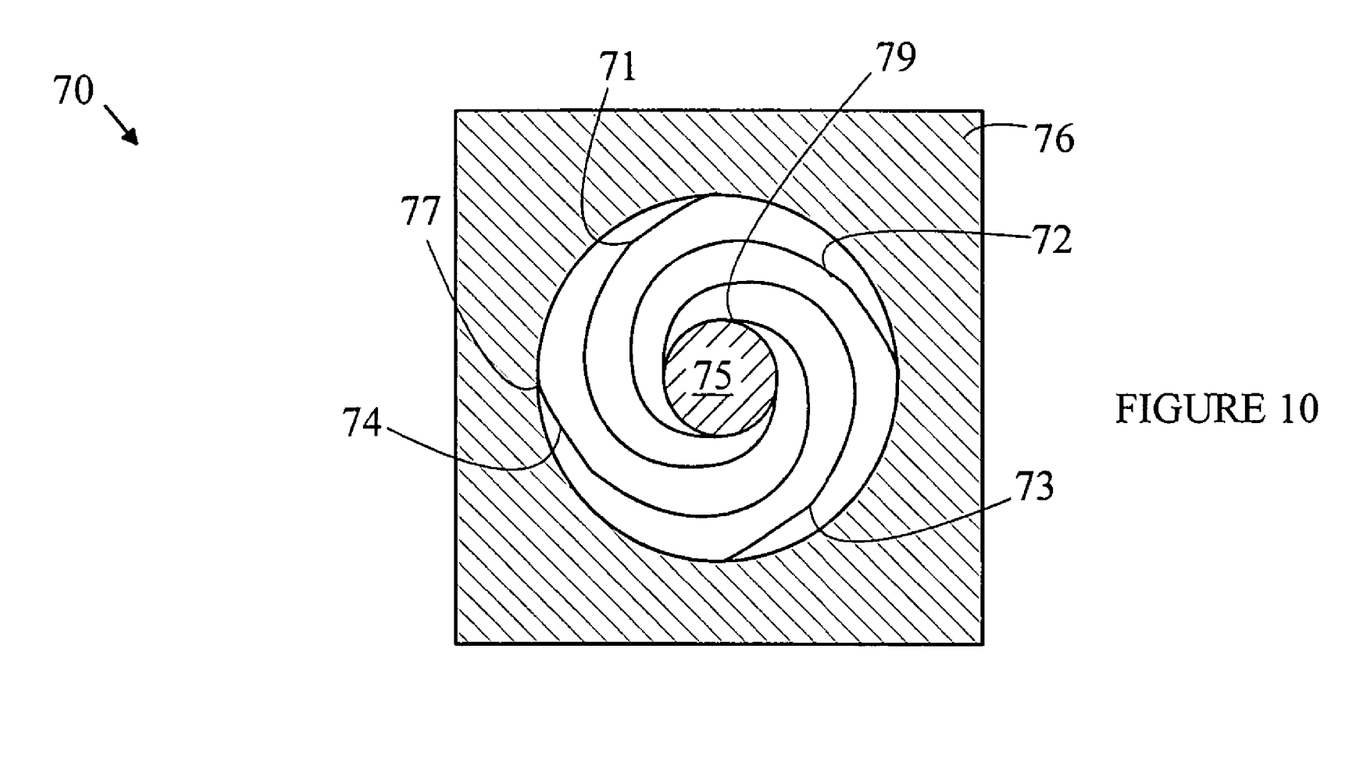
FIG. 10 is a top view of a pointing device 70 according to another embodiment of the present invention.

Refer now to FIG. 10, which is a top view of a pointing device 70 according to another embodiment of the present invention. Pointing device 70 uses a spiral spring design that more nearly provides the ideal characteristics discussed above. Puck 75 is attached to four spiral members shown at 71-74. Each spiral member has one end attached to puck 75 and the other end attached to the fixed portion of the pointing device at a point on the periphery of the puck field of motion 76. A typical attachment point is shown at 77.

The optimal spring is a spiral that turns through approximately 270-360 degrees. That is, a spring connected to the top of the puck at 12 o'clock as shown at 79 ends between 9 o'clock and 12 o'clock on the boundary of the puck field of motion as shown at 77. While this is the preferred spring configuration, other spring configurations can be utilized. If shorter springs are used, the puck tends to rotate as it moves to the extremities of the puck field of motion. Such rotations can interfere with the position sensing mechanism in some designs. Springs longer than 360 degrees consume more of the available space and result in softer restoring forces.

The puck design shown in FIG. 9A has a dead space adjacent to the boundary of the puck field of motion that is three times the width of a spring. Metal springs that are approximately 0.25 mm in width perform adequately. Hence, an area that is less than 1 mm wide adjacent to the boundary of the puck field of motion is all that is wasted in such spiral spring based pointing devices. Plastic springs 0.75 mm wide and 1.5 mm thick are adequate for a puck that is 30 mm in diameter in a 60 mm diameter field of motion.

The embodiment shown in FIG. 10 utilizes a planar spiral member for each of the springs. That is, the curve executed by the spring when the puck is centered in the puck field of motion is given by R=k−k'θ, in a polar coordinate system (R, θ). Here, k and k' are constants. While this curve is a good approximation for most of the spring's length, a curve that differs from this relationship at the two ends is advantageous. In such a spring, the two ends of the spiral are modified to make the ends nearly tangential to the points at which the spring attaches to the puck and the boundary of the puck field of motion. This modification allows the puck to more easily reach the extremities of the puck field of motion. In addition, it will be appreciated that the exact curve executed by each planar spiral member can differ somewhat from a perfect spiral and still provide substantial benefits over other spring designs. Accordingly, the term "planar spiral member" will be defined to include any linear structure having a length L and a centerline that executes a curve in a polar coordinate system (R, θ) such that for any given value of θ, R is within 25% percent of $R_0$=k−k'θ for at least 50% percent of L. In addition, other forms of arcuate springs can be utilized; although such springs do not provide all of the advantages of the spiral members discussed above.

The above-described embodiments of the present invention utilize four springs for restoring the puck to its resting position. However, other numbers of springs can be utilized. In principle, one spring could be used; however, the spring would need to provide the return force in two directions, and hence, would no longer be isotropic, and would be much stiffer than the springs described above. In addition, more springs can be used to provide additional electrical connections to the puck.

The springs in the above-described embodiments ideally return the puck to a resting position that is in the center of the field of motion. Such embodiments maximize the amount of motion that can be accommodated from the resting position. However, it will be apparent from the preceding discussion that the puck need not be returned exactly to the same starting position each time it is released. Similarly, the puck need not return to a resting position that is exactly in the center of the puck field of motion. So long as the puck returns to a position that is near enough to the center of the puck field of motion to allow the puck to be moved from that position to a new position in some desired direction, the present invention will provide an improvement over the meander spring design discussed above.

It should be noted that the puck preferably returns to its resting position with as few oscillations as possible. Hence, some form of oscillation damping is preferably included. One method for damping oscillations is to assure that the puck is pressed against the underlying surface as it returns to its resting position when released by the user. In this case, the friction between the puck and underlying surface provides the damping force. This can be accomplished by mounting the springs such that the springs apply a downward force on the puck. For example, the attachment point for the end of the spring on the puck can be located at a greater distance from the working surface than the attachment point for the other end of the spring. Alternatively, the springs can be deformed so that each spring exerts a downward force in addition to the restoring forces described above.

Figure 11:
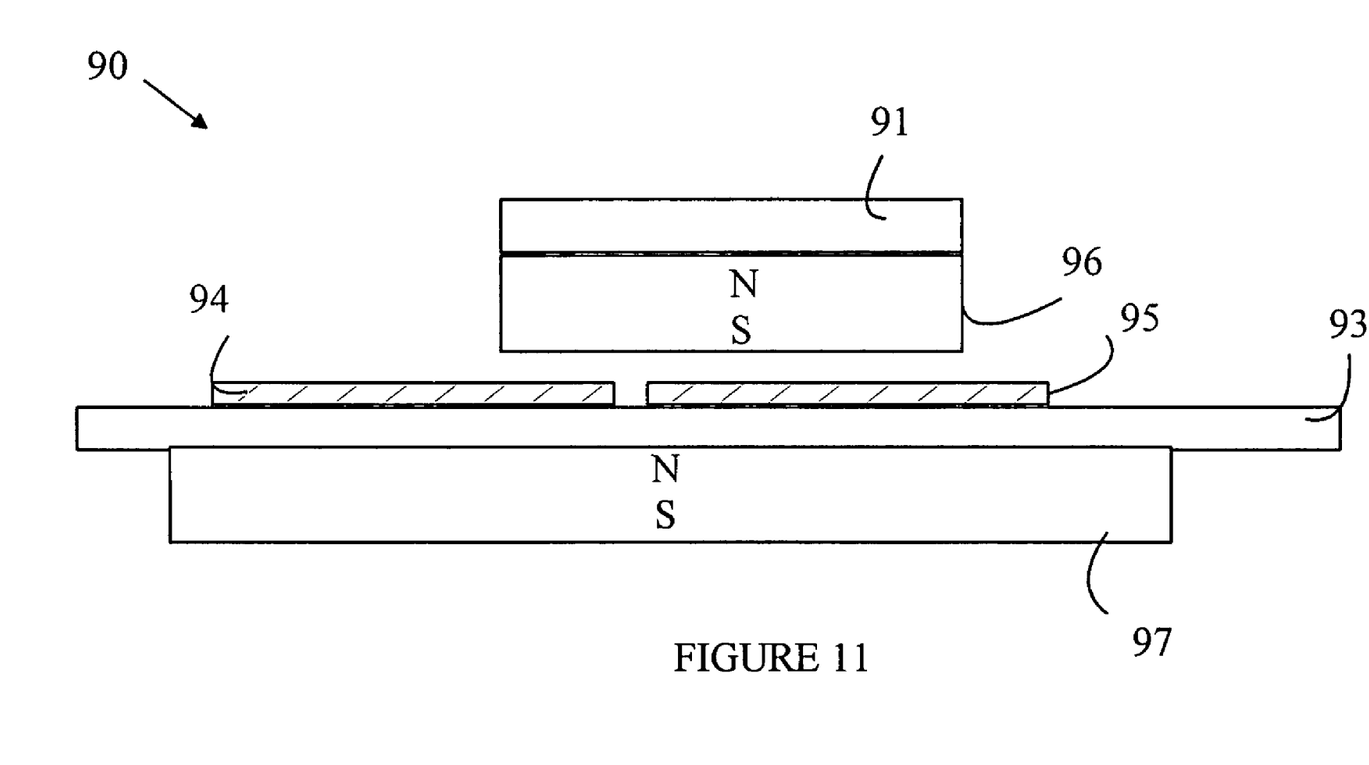
FIG. 11 is a cross-sectional view of yet another embodiment of a pointing device according to the present invention.

The embodiments of the present invention described above utilize springs to restore the puck to its resting position when the user releases the puck. However, other mechanisms for restoring the puck to its resting position when the puck is released by the user can also be utilized. For example, the puck may include a magnet that is attracted to a corresponding magnet within the substrate under the puck. Such an embodiment is shown in FIG. 11, which is a cross-sectional view of yet another embodiment of a pointing device according to the present invention. Pointer 90 includes a puck 91 that is similar to the pucks described above in that the puck includes a pressure sensing mechanism for defining a pressure threshold. Pointer 90 also includes an electrode on the bottom of the puck for measuring the position of the puck relative to electrodes on the substrate 93 over which the puck moves. Exemplary substrate electrodes are shown at 94 and 95. Puck 91 also includes a magnet 96 that provides both the restoring force for returning the puck to its resting position when the puck is released by the user and the electrode structure for measuring the position of the puck. A corresponding magnet 97 is included in substrate 93. The poles of magnet 97 are arranged opposite to those of magnet 96. The magnetic fields of the magnets are chosen such that the fields have their maximum values at the center of the magnets shown in FIG. 10 and decrease with distance from the center of the magnets. Hence, when the puck is released, it will be returned to a resting position in which the magnets are centered over one another. It should also be noted that the magnets provide the downward damping force discussed above for reducing any oscillations of the puck about its resting position when the puck is released.

The above-described embodiments of the present invention use the force exerted by the user's finger to trigger the coupling of the puck motion to the cursor motion on the display. However, other mechanisms can be utilized for signaling the cursor coupling. For example, the presence of the user's finger on the puck can be sensed capacitatively. Since such sensors are known to the art, they will not be discussed in detail here. It is sufficient to note that the presence of the user's finger measurably alters the capacitance of one or more electrodes on the puck.

The user sensor may also be implemented without a separate force or capacitance sensor, but rather by software analysis of the puck x and y positions by the controller. When the puck is snapping back to the center under the force of the re-centering springs, the direction and acceleration of the puck motion can be used to determine if the puck is being manipulated by the user or is just under the influence of the springs.

The above-described embodiments of the present invention utilize some form of restoring mechanism for returning the puck to its resting position when the user releases the pressure on the puck. However, embodiments of the present invention in which the restoring mechanism is the user's finger can also be constructed. In such an embodiment, the user would reduce the pressure on the puck to a level below the level at which the coupling of the puck to the cursor occurs. The user can then move the puck to a new location manually without engaging the cursor on the display. The user can then continue the cursor movement by once again pressing on the puck with sufficient pressure to activate the coupling of the puck and the cursor.

The above-described embodiments of the present invention refer to the puck being returned to a predetermined resting point by the restoration mechanism when the user releases the puck. As noted above, the predetermined embodiments include some form of damping force to minimize the time needed for oscillations in the puck position to die out after the puck is released. As a result, the puck will not always return to precisely the starting point. However, such a precise return is not needed. Embodiments in which the puck returns generally to some predetermined starting area also perform satisfactorily. Any starting area that is sufficiently removed from the boundary of the puck field of motion will perform satisfactorily.

While the above-described embodiments of the present invention have utilized a puck field of motion that is circular, the puck field of motion can have other shapes. For example, the puck field of motion could be elliptical or rectangular. In these cases, the optimal spring shapes will be different than those described above.

Various modifications to the present invention will become apparent to those skilled in the art from the foregoing description and accompanying drawings. Accordingly, the present invention is to be limited solely by the scope of the following claims.

What is claimed is:

1. A pointing system, comprising:
(a) a moveable puck configured to move laterally within a puck field of motion ("PFOM") in response to a user applying a lateral force thereto, the puck comprising a pressure sensing system configured to sense a first predetermined vertical pressure level applied by the user to the puck;
(b) a position detector configured to measure puck position within the PFOM as the puck is moved laterally by the user therewithin, the position detector further being configured to report the puck position to a processor configured to actuate or cause to be actuated tracking or movement of a cursor on a display, the tracking or movement of the cursor corresponding to lateral movement of the puck by the user within the PFOM; and
(c) a puck return mechanism attached to the puck and configured to return the puck to, or hold the puck in, a resting position within the PFOM when the user stops applying, or does not apply, vertical pressure to the puck;
wherein the system is configured actuate or cause to be actuated tracking or movement of the cursor on the display corresponding to lateral movement of the puck by the user within the PFOM when the user applies vertical pressure to the puck that is greater than or equal to the first predetermined vertical pressure level, and to cause the cursor to stop tracking or moving on the display when the user applies vertical pressure to the puck that is at least one of less than the first predetermined level and no vertical pressure.

2. The system of claim 1, wherein the pressure sensing system is further configured to sense a second predetermined vertical pressure level applied by the user to the puck, the second predetermined vertical pressure level being greater than the first predetermined pressure level.

3. The pointing system of claim 2, wherein the system is further configured to implement a "click" function when the user applies vertical pressure to the puck that is greater than or equal to the second predetermined pressure level.

4. The system of claim 3, wherein when the "click" function is implemented tactile feedback is provided to the user.

5. The system of claim 1, wherein the position detector comprises a capacitance measurement circuit.

6. The system of claim 1, wherein the position detector comprises an electrical current measurement circuit.

7. The system of claim 1, wherein the position detector comprises an optical imaging system.

8. The system of claim 1, wherein the pressure sensing system comprises a capacitance measurement system.

9. The system of claim 1, wherein the pressure sensing system comprises a compressible foam layer whose electrical resistivity varies according to the amount by which the foam is compressed by the user.

10. The system of claim 9, wherein the puck return mechanism further comprises means for damping oscillations induced by the plurality of springs.

11. The system of claim 1, wherein the puck return mechanism comprises a plurality of magnets.

12. The system of claim 1, wherein the puck return mechanism comprises a plurality of springs.

13. The system of claim 12, wherein the plurality of springs includes at least one of a meander spring, a helical spring and a spiral spring.

14. The system of claim 12, wherein the plurality of springs comprises at least four springs.

* * * * *